US011693577B2

(12) United States Patent
Veluswamy et al.

(10) Patent No.: US 11,693,577 B2
(45) Date of Patent: Jul. 4, 2023

(54) STORAGE OPERATION PROCESSING DURING DATA MIGRATION USING MIGRATED INDICATOR FROM SOURCE STORAGE

(71) Applicant: Western Digital Technologies, Inc., San Jose, CA (US)

(72) Inventors: Senthil Kumar Veluswamy, Bangalore (IN); Rahul Gandhi Dhatchinamoorthy, Bangalore (IN); Kumar Ranjan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/503,950

(22) Filed: Oct. 18, 2021

(65) Prior Publication Data

US 2023/0121646 A1 Apr. 20, 2023

(51) Int. Cl.
*G06F 3/06* (2006.01)
(52) U.S. Cl.
CPC ............ *G06F 3/0647* (2013.01); *G06F 3/061* (2013.01); *G06F 3/067* (2013.01)

(58) Field of Classification Search
CPC . G06F 3/067; G06F 3/061; G06F 3/0647–065
See application file for complete search history.

(56) References Cited

U.S. PATENT DOCUMENTS

| 10,877,682 B2 | 12/2020 | Veluswamy et al. |
| 2014/0223046 A1* | 8/2014 | Liu ........................ G06F 3/0665 710/74 |
| 2019/0250845 A1 | 8/2019 | Kabra et al. |
| 2021/0019054 A1* | 1/2021 | Anchi ..................... G06F 3/067 |

\* cited by examiner

*Primary Examiner* — Chie Yew
(74) *Attorney, Agent, or Firm* — Patent Law Works LLP

(57) ABSTRACT

Systems and methods for storage operation processing during data migration using selective block migrated notifications are disclosed. A host system may be configured with connections to a source storage node and a destination storage node while a data migration is moving data blocks from the source to the destination. The host may send a storage request to the source storage node and receive a block migrated notification from the source storage node. The host may then store a migrated indicator for that data block in a migration table and direct future storage requests to the destination storage node.

20 Claims, 8 Drawing Sheets

STORAGE OPERATION PROCESSING DURING DATA MIGRATION USING MIGRATED INDICATOR FROM SOURCE STORAGE

TECHNICAL FIELD

The present disclosure generally relates to storage systems, more particularly, to storage operation processing during data migrations between storage systems.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Array (AFA) architecture, and Ethernet Attached Bunch of Flash (EBOF) disaggregated storage, which typically uses specialized chips from Mellanox or Kazan to translate commands from external NVMe-OF (Non-Volatile Memory Express over Fabrics) protocol to internal NVMe (NVM Express) protocol. These architectures may be configured to support various Quality of Service (QoS) metrics and requirements to support host applications, often supporting a plurality of host systems with different workload requirements across a plurality of backend storage systems, such as AFAs of varying specifications, ages, and manufacturers.

Over time, backend storage systems may be added, replaced, or reconfigured and data may be migrated from one data storage system to another data storage system, such as from an aging source AFA to a new destination AFA. The system owner may prefer to replicate one or more namespaces from the source system to the destination system without interrupting storage input/output (I/O) operations to those namespaces. Various cutover techniques between the two data storage systems in the data migration have been used to transition storage operations without losing or corrupting data.

The most common cutover techniques may be early cutover and late cutover migration methods. Early cutover may include disconnecting the host system from the source data storage system as soon as the migration begins. However, this leaves the destination data storage system handling all storage requests and managing bookkeeping on transferred data blocks, which may result in reducing performance during the data migration, particularly if there are any failures or interruptions during the data migration. Late cutover may be based on determining a convergence window when the source connection can be disconnected following the transfer of the last data block to be migrated. However, in systems with heavy I/O operations, frequent modifications may make hitting this convergence window and successfully completing the data migration difficult.

Therefore, there still exists a need for storage systems implementing data migration methods that improve efficient use of the resources of each system to successfully complete data migrations in a reliable manner.

SUMMARY

Various aspects for storage operation processing during data migration using selective migration notifications are disclosed. More particularly, selective block migrated notifications from the source data storage system may.

One general aspect includes a system that includes a host system. The host system includes a processor, a memory, and a storage system interface configured to communicate with a source storage node configured to store a plurality of data blocks prior to a data migration and a destination storage node configured to store the plurality of data blocks responsive to completing the data migration. The host system also includes a migration table configured to selectively identify transferred data blocks during the data migration and migration logic configured to: send, to the source storage node, a first storage request directed to a target data block in the plurality of data blocks; receive, from the source storage node, a migrated block notification for the target data block; store, in the migration table, a migrated indicator for the target data block; and send, responsive to the migrated indicator for the target data block, a second storage request directed to the target data block to the destination storage node.

Implementations may include one or more of the following features. The host system may further include: a storage request manager configured to determine the first storage request and the second storage request; and a host completion queue configured to receive a first request response for the first storage request from the source storage node, and a second request response for the second storage request from the destination storage node. The destination storage node may be further configured to determine, using the target data block, the first request response and the second request response. The system may include the source storage node, where the source storage node is further configured to: forward the first storage request to the destination storage node; receive the first request response from the destination storage node; and forward the first request response to the host completion queue. The source storage node may be further configured to: initiate the data migration; transfer the plurality of data blocks to the destination storage node during the data migration; determine that the data migration is complete; and send a migration complete notification to the host system. The source storage node may further include a source bitmap including validity indicators for the plurality of data blocks. The source storage node may be further configured to, responsive to receiving the first storage request: determine, using the validity indicator in the source bitmap for the target data block, a validity condition of the target data block in the source storage node; and responsive to the validity condition of the target data block being invalid in the source storage node, send to the host system the migrated block notification for the target data block, and forward to the destination storage node the first storage request. The source storage node may be further configured to, responsive to the first storage request being a write operation and the validity indicator in the source bitmap for the target data block being valid, invalidate the target data block in the source bitmap. The plurality of data blocks may include a namespace and the storage system interface may be further configured to include: a first connection assigned to the namespace and a first network address for the source storage node; and a second connection assigned to the namespace and a second network address for the destination storage node. The migration logic may be configured as a multipath policy for a namespace during the data migration and the host system may be further configured to disable, responsive to the data migration being complete, the multipath policy for the namespace. The migration logic may be further configured to: check, prior to sending the first storage request, the migration table for the migrated indicator for the target data block; and check, prior to sending the second storage request, the migration table for migrated indicator for the target data block, where the migrated indicator for the target data block is not present at a first time associated with checking prior to sending the first storage request and the migrated indicator for the target data block is present at a second time associated with checking prior to sending the second storage request. Responsive to the migration being complete: the host system may be further configured to delete the migration table and disconnect from the source storage node; and the source storage node may be further configured to delete a source bitmap configured for tracking validity of the plurality of data blocks in the source storage node; and delete a namespace corresponding to the plurality of data blocks.

Another general aspect includes a computer-implemented method that includes: storing, in a source storage node, a plurality of data blocks prior to a data migration; migrating the plurality of data blocks from the source storage node to a destination storage node during the data migration; and processing, by the host system, storage requests targeting the plurality of data blocks during the data migration. Processing storage requests includes: sending, to the source storage node, a first storage request directed to a target data block in the plurality of data blocks; receiving, from the source storage node, a migrated block notification for the target data block; storing, in a migration table, a migrated indicator for the target data block; and sending, responsive to the migrated indicator for the target data block, a second storage request directed to the target data block to the destination storage node.

Implementations may include one or more of the following features. The computer-implemented method may include: determining, by the destination storage node and using the target data block, a first request response for the first storage request; receiving, at a host completion queue of the host system and from the source storage node, the first request response; determining, by the destination storage node and using the target data block, a second request response for the second storage request; and receiving, at the host comp Receiving, at the host completion queue of the host system and from the destination storage node, the second request response. The computer-implemented method may include: forwarding, from the source storage node, the first storage request to the destination storage node; receiving, by the source storage node, the first request response from the destination storage node; and forwarding, by the source storage node, the first request response to the host completion queue. The computer-implemented method may include: initiating, by the source storage node, the data migration; transferring, by the source storage node, the plurality of data blocks to the destination storage node during the data migration; determining, by the source storage node, that the data migration is complete; and sending, by the source storage node, a migration complete notification to the host system. The computer-implemented method may include, responsive to the source storage node receiving the first storage request, determining, using a validity indicator in a source bitmap for the target data block, a validity condition of the target data block in the source storage node and responsive to the validity condition of the target data block being invalid in the source storage node: sending, from the source storage node to the host system, the migrated block notification for the target data block; and forwarding, from the source storage node to the destination storage node, the first storage request. The computer-implemented method may include: determining an operation type for the first storage request; and, responsive to determining the operation type of the first storage request to be a write operation and the validity indicator in the source bitmap for the target data block being valid, invalidating the target data block in the source bitmap. The computer-implemented method may include: determining a first connection assigned to a namespace and a first network address for the source storage node, wherein the plurality of data blocks comprises the namespace; and determining a second connection assigned to the namespace and a second network address for the destination storage node. The computer-implemented method may include: checking, prior to sending the first storage request, the migration table for the migrated indicator for the target data block, where the migrated indicator for the target data block is not present at a first time associated with checking prior to sending the first storage request; and checking, prior to sending the second storage request, the migration table for migrated indicator for the target data block, where the migrated indicator for the target data block is present at a second time associated with checking prior to sending the second storage request. The computer-implemented method may include:

determining the data migration is complete; and responsive to determining the data migration is complete: deleting the migration table; disconnecting the host system from the source storage node; deleting, from the source storage node, a source bitmap configured for tracking validity of the plurality of data blocks in the source storage node; and deleting, from the source storage node, a namespace corresponding to the plurality of data blocks. Implementations of the described techniques may include hardware, a method or process, or computer software on a computer-accessible medium.

Still another general aspect includes a storage system including: a source storage node configured to store a plurality of data blocks prior to a data migration; a destination storage node configured to store the plurality of data blocks responsive to completing the data migration; and a host system configured for communication with the source storage node and the destination storage node. The host system includes: a migration table configured to selectively identify transferred data blocks during the data migration;

and means for sending, to the source storage node, a first storage request directed to a target data block in the plurality of data blocks; means for receiving, from the source storage node, a migrated block notification for the target data block; means for storing, in the migration table, a migrated indicator for the target data block; and means for sending, responsive to the migrated indicator for the target data block, a second storage request directed to the target data block to the destination storage node. The various embodiments advantageously apply the teachings of data storage devices and/or multi-device storage systems to improve the functionality of such computer systems.

The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve storage operation processing during data migrations, such as by using selective block migrated notifications to enable a host system to direct storage requests between source and destination storage systems. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
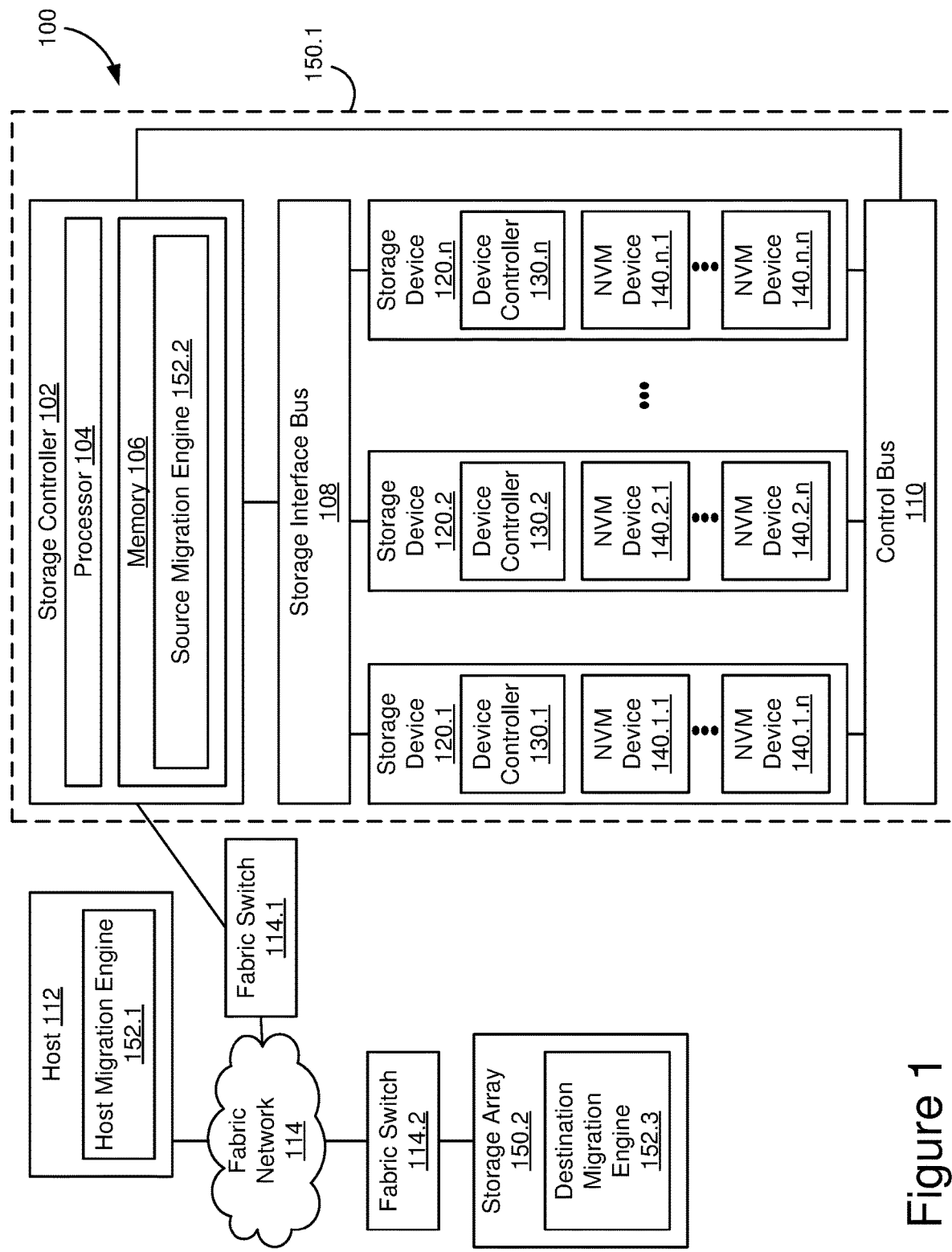
FIG. 1 schematically illustrates a storage system supporting data migration between two data storage arrays.

FIG. 1 shows an embodiment of an example data storage system 100 with multiple data storage devices 120 configured in storage arrays 150 for supporting one or more host systems 112 during a data migration. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node (storage array 150.1) with storage controller 102. In some embodiments, storage array 150.2 may be configured similarly to storage array 150.1, including a plurality of storage devices 120 and another storage controller 102, but the details have been omitted for brevity. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114. In the example fabric network shown, fabric switches 114.1 and 114.2 provide interfaces to storage array 150.1 and 150.2 respectively.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QoS) standards for those entities and their applications.

Storage controller 102 may include one or more central processing units (CPUs) or processor 104 for executing compute operations, storage management operations, and/or instructions for accessing storage devices 120 through storage interface bus 108. In some embodiments, processor 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources. Storage controller 102 may include a memory 106 configured to store data and functions for execution by processor 104, as further detailed below.

In the configuration shown, storage array 150.1 may be configured as a source storage node for a migration operation, storage array 150.2 may be configured as a destination node for the migration operation, and host system 112 may be configured as a host node for the migration operation. For example, host system 112 may initially be configured to receive, generate, and/or determine storage operations for execution using storage devices 120 in storage array 150 during a time period prior to initiating the data migration, resulting in existing data stored in storage array 150.1. Storage array 150.2 may be a new storage node intended to take over handling storage operations for the data stored in storage array 150.1. In some embodiments, each of host system 112, storage array 150.1, and storage array 150.2 may include a portion of a migration engine 152 that includes at least a portion of the logic and data for managing the data migration and ongoing storage operations to be processed during the data migration. For example, host system 112 may include a host migration engine 152.1, source storage array 150.1 may include a source migration engine 152.1, and destination storage array 150.2 may include a destination migration engine 152.3. Migration engine 152 may be active during a migration operation having a migration period that lasts from initiation of the data migration to completion of the data migration. Storage system 100 may be configured for an operating state using source storage array 150.1 during an operating period prior to the data migration and using destination array 150.2 during an operating period following the data migration. The logic and data supporting migration engine 152 and the roles of the host system, source node, and destination node may be further explained below.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
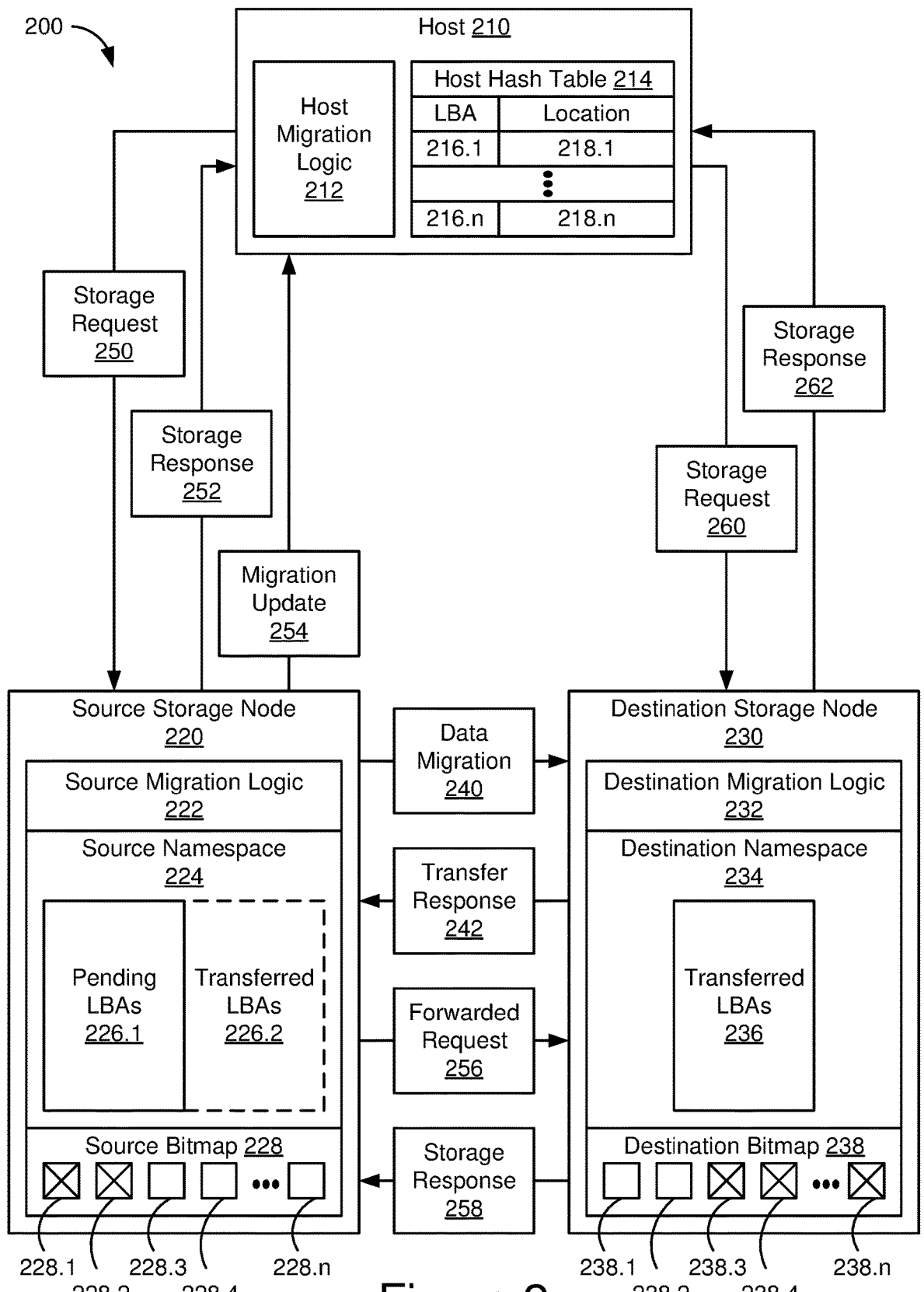
FIG. 2 schematically illustrates storage operation processing during a data migration between two storage nodes.

FIG. 2 shows a schematic representation of a storage system 200 that may be configured similarly to storage system 100 in FIG. 1 for a data migration with ongoing storage operation processing. A host system 210 includes host migration logic 212 and an accompanying host hash table 214 configured to selectively track the location of migrated data blocks based on their LBAs. In some embodiments, host migration logic 212 includes rules for evaluating storage requests to determine whether each storage request should be sent to source storage node 220 or destination storage node 230 during the data migration. Before and after the data migration, host migration logic 212 and host hash table 214 may not be used. In some embodiments, host migration logic 212 may be embodied in a multipath policy for a namespace or similar logical data container being migrated. For example, the multipath policy may define connections to source node 220 and destination node 230 and provide the logic for selecting between the nodes.

In some embodiments, the selection logic may be based on a migration table, such as host hash table 214. For example, host hash table 214 may use hashes to provide an efficient index of LBAs 216.1-216.n that have been migrated from source storage node 220 to destination storage node 230. In some embodiments, each entry in host hash table 214 may correspond to an LBA 216 and a location 218 that corresponds to whether or not that data block has been migrated. For example, LBA 216.1 may be a unique identifier for a particular data block and location 218.1 may be a system identifier or network address for destination storage node 230. In some embodiments, host hash table 214 may comprise an ordered list of entries where each entry identifies a data block, such as by host LBA, and the presence or absence of an entry for a target data block may serve as a migrated indicator for that data block. For example, if the host LBA is found in host hash table 214, then the corresponding data block is in destination storage node 230, if the host LBA is not found in host hash table 214, then the corresponding data block is assumed to be in source storage node 220.

In some embodiments, host hash table 214 may be populated based on location or migrated status updates from source storage node 220 that are provided when host 210 sends a storage request for a data block that has already been migrated. For example, host hash table 214 may be initialized as an empty table at the beginning of the data migration and the list of migrated data blocks may be selectively updated based on the storage requests sent and responses received. Host 210 may not be configured to populate host hash table 214 with all LBAs in the target namespace or with any LBA that is located in source storage node 220 to avoid the overhead of pre-generating a complete LBA location table. Host migration logic 212 may use reference to host hash table 214 to determine a "best guess" of where the target data block is, assuming that the data block is in source storage node 220 until told otherwise.

Source storage node 220 may be a storage node containing the current data for the namespace as of the beginning of the data migration. Destination storage node 230 may be a storage node configured to receive the data for the namespace and have the current data as of the completion of the data migration. Because storage operations will continue to occur during the data migration, the data in the namespace at the end of the data migration will not be the same as the data in source storage node 220 at the beginning of the data migration. Both source storage node 220 and destination storage node 230 may be configured to process storage operations for host 210 during the data migration and return corresponding results to host 210. While processing those ongoing transactions from host 210, source storage node 220 and destination storage node 230 may be engaged in a direct transfer of data blocks to execute the migration of the namespace.

In some embodiments, source storage node 220 may include source migration logic 222 configured to manage the data migration between source storage node 220 and destination storage node 230. For example, source migration logic 222 may initiate the data migration, determine a queue of data blocks to be transferred, execute each data block transfer, monitor confirmations of each transfer from destination storage node 230, maintain migration status for each data block, and determine when data migration is complete. In some embodiments, both source storage node 220 and destination storage node 230 may be configured to define the same namespace, designated source namespace 224 in source storage node 220 and destination namespace 234 in destination storage node 230. Source migration logic 222 may manage the migration of the data blocks in the namespace from source namespace 224 to destination namespace 234. Note that, from the host perspective, source namespace 224 and destinations namespace 234 may be the same namespace and host 210 does not need to know the physical location of the host LBAs in that namespace, such as using NVMe protocols and NVMe-oF connections and addressing. Host 210 may expect the response to a storage request to be returned from the same namespace connection, which may be addressed by source migration logic 222 selectively managing storage request and response forwarding for some migrated data blocks.

In some embodiments, destination storage node 230 may include destination migration logic 232 configured to manage the receipt and confirmation of migrated data blocks, track transferred data blocks, and handle storage requests forwarded by source storage node 220. In some embodiments, source storage node 220 may initiate data migration 240 to transfer data blocks from source namespace 224 to destination namespace 234. The data migration may start with all LBAs in the namespace residing in source namespace 224 as pending LBAs 226.1, pending LBAs being the valid data blocks that have not yet been transferred to destination namespace 234. Data migration 240 may include the sequential transfer of data blocks (identified by LBAs) from source storage node 220 to destination storage node 230. For example, source storage node 220 and destination storage node 230 may have a direct, network, or fabric connection that enables peer-to-peer data transfer without involving host 210. As data migration 240 proceeds, transferred LBAs 236 are stored in destination namespace 234. Destination storage node 230 may confirm each transfer and send transfer response 242 to source storage node 220 as each data block is stored in transferred LBAs 236. These transferred LBAs 236 are no longer valid as transferred LBAs 226.2 in source namespace 224. In some embodiments, source namespace 224 may delete transferred LBAs 226.2 after transfer is confirmed or they may be deleted when the migration is complete and source namespace 224 can be deleted.

In some embodiments, source migration logic 222 and/or destination migration logic 232 may maintain migration status information to track transferred data blocks and which blocks are valid or invalid on each system. For example, source storage node 220 and/or destination storage node 230 may each include bitmaps for tracking the validity condition or status of each data block in the namespace. Source storage node 220 may include source bitmap 228 comprised of a plurality of validity indicators 228.1-228.n corresponding to the data blocks in source namespace 224. Each validity indicator may include a binary value to indicate a valid (empty or 0) or invalid (crossed out or 1) data block condition. In the example shown, validity indicators 228.1 and 228.2 in source bitmap 228 may correspond to transferred LBAs 226.2 and denote an invalid condition or status for those data blocks. Validity indicators 228.3-228.n may correspond to pending LBAs 226.1 and denote a valid condition or status for those data blocks. Source migration logic 222 may only change the status of a data block to invalid responsive to a corresponding transfer response 242 being received. Destination storage node 230 may include destination bitmap 238 comprised of a plurality of validity indicators 238.1-238.n configured similarly to source bitmap 228 but indicating the data block validity condition in destination storage node 230. In the example shown, validity indicators 238.1 and 238.2 in destination bitmap 238 may correspond to transferred LBAs 236 and denote a valid condition for those data blocks. Validity indicators 238.3-238.n may correspond to pending LBAs that have not yet been received by destination storage node 230 and denote an invalid condition for those data blocks. In some embodiments, destination bitmap 238 may only include validity indicators for transferred LBAs.

When a new storage request is received, generated, or otherwise determined by host 210, host migration logic 212 checks the target data block of the storage request against host hash table 214. For example, host migration logic 212 may use the host LBA as a key for searching host hash table 214 to determine whether there is a corresponding migrated indicator entry. If there is no migrated indicator entry for the target data block, host migration logic 212 may direct the storage request to source storage node 220 as storage request 250. If there is a migrated indicator entry for the target data block indicating that the valid version of the data block is in destination storage node 230, host migration logic 212 may direct the storage request to destination storage node 230 as storage request 260.

When source storage node 220 receives storage request 250, it may determine whether the valid target data block is stored in source namespace 224 or destination namespace 234. For example, source migration logic 222 may check source bitmap 228 for the validity indicator corresponding to the target data block. If the validity indicator is valid, source storage node 220 may process the storage request as normal and return storage response 252.

If the validity indicator is invalid, source migration logic 222 may initiate two actions. Source migration logic 222 may send migration update 254, such as a migrated block notification for the target data block, to host 210. Host 210 may update host hash table 214 responsive to migration update 254, such as by adding an entry with a migrated block indicator to host hash table 214. Source migration logic 222 may also forward the storage request to destination storage node 230 as forwarded request 256. Destination storage node 230 may process the storage request using the valid transferred LBAs 236 and return storage response 258 to source storage node 220. Source storage node 220 may forward storage response 258 as storage response 252 to complete the storage request. In some embodiments, host 210 may expect the response to a storage request to come from the same connection to which the storage request was sent, so source storage node 220 may be configured to proxy the request to destination storage node 230 and handle the response, rather than enabling destination storage node 230 to return the storage response directly.

When host hash table 214 and host migration logic 212 indicate that the target data block has been migrated, the storage request may be directed to destination storage node 230 as storage request 260. Destination storage node 230 may process the storage operation as normal using transferred LBAs 236 and return storage response 262. After data migration is complete, all valid data blocks will reside in destination storage node 230 and, going forward, all storage requests to the namespace may be directed to destination namespace 234. In some embodiments, host migration logic 212 may be disabled and host hash table 214 deleted. For example, the multipath policy that included host migration logic 212 and host hash table 214 may be inactivated and the corresponding memory allocations used for other functions. The namespace connection between host system 210 and source storage node 220 may be disconnected and source storage node 220 may delete source namespace 224 and corresponding source bitmap 228.

Figure 3:
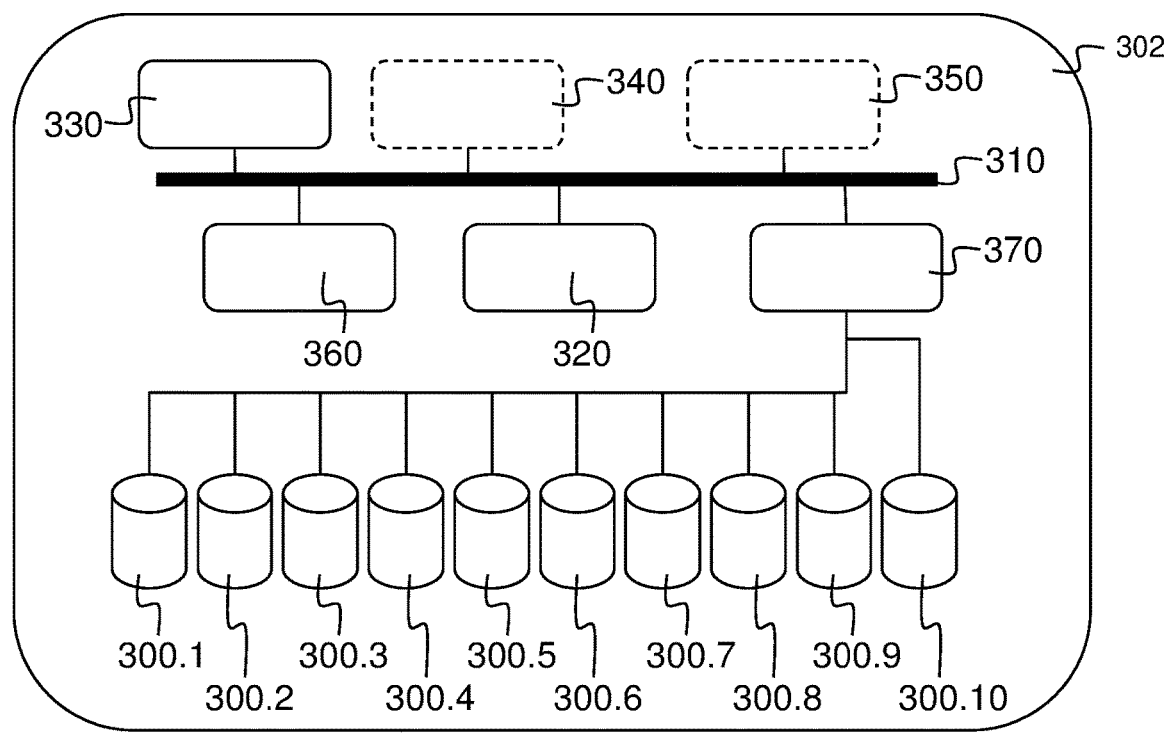
FIG. 3 schematically illustrates a storage node of the storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) SATA-II disk drives or 2 TB NVMe solid state drives (SSDs), and control the reading and writing of data to/from these storage elements 300. As shown in FIG. 3, such a storage node 302 could comprise ten 2 TB NVMe SSDs as storage elements 300.1-300.10 and in this way storage node 302 would provide a storage capacity of 20 TB to the storage systems 100 or 200.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
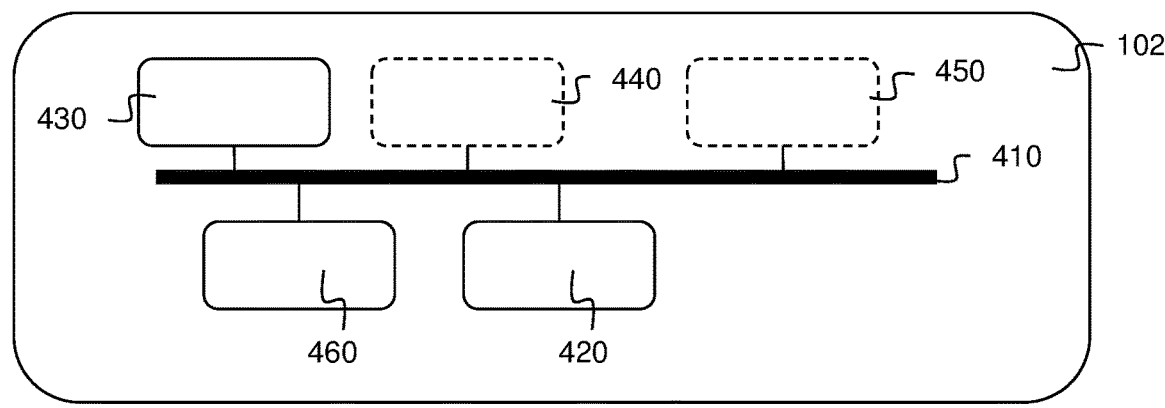
FIG. 4 schematically illustrates a host node of the storage system of FIG. 1.

FIG. 4 shows a schematic representation of an example host system 112 or host node. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
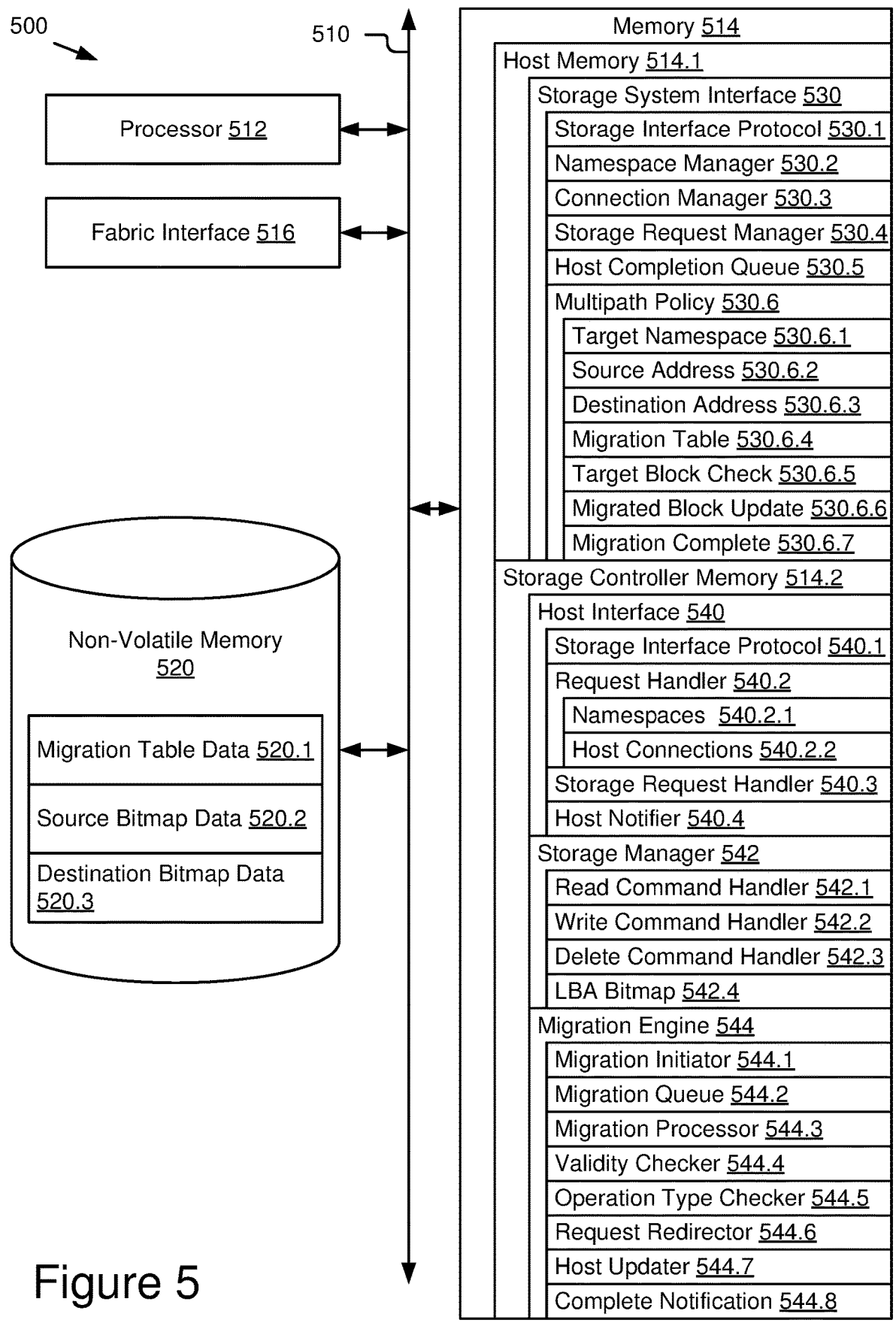
FIG. 5 schematically illustrates some elements of the storage systems of FIGS. 1-4 in more detail.

FIG. 5 schematically shows selected modules of a storage system 500 configured for processing storage operations during data migration. Storage system 500 may incorporate elements and configurations similar to those shown in FIGS. 1-4, including elements of a host system or host nodes and storage arrays or storage nodes. For example, storage system 500 may be configured to include the functions of a host system 112 in host memory 514.1 and at least one storage controller 102 in storage controller memory 514.2. In some embodiments, bus 510, processor 512, fabric interface 516, and non-volatile memory 520 may include a plurality of each component, where each device or node (e.g., host node, source storage node, and destination storage node) has a dedicated bus 510, processor 512, fabric interface 516, and non-volatile memory 520.

Storage system 500 may include a bus 510 interconnecting at least one processor 512, at least one memory 514, and at least one interface, such as fabric interface 516 8. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Fabric interface 516 may include a physical interface for connecting to one or more fabric components using an interface protocol that supports storage device access. For example, fabric interface 516 may include an ethernet or similar network interface connector supporting NVMe-oF access to solid state media. In some embodiments, fabric interface 516 may include an ethernet connection to a fabric switch, or similar network interface connector supporting NVMe host connection protocols, such as RDMA and transmission control protocol/internet protocol (TCP/IP) connections.

Storage system 500 may include one or more non-volatile memory devices 520 or similar storage elements configured to store data, which may include host data. For example, non-volatile memory devices 520 may include a plurality of SSDs or flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc.

Storage system 500 may include a plurality of modules or subsystems that are stored and/or instantiated in memory 514 for execution by processor 512 as instructions or operations. In the example shown, memory 514 includes two distinct memory subsystems, host memory 514.1 and storage controller memory 514.2 (which may be instantiated for multiple storage nodes), where the functions of a data migration engine are divided across different nodes in the system. Each of these memory subsystems may, in turn, comprise additional modules or subsystems. For example, host memory 514.1 may include a storage system interface 530 configured for managing storage operations during a data migration. Storage controller memory 514.2 may include a host interface 540 configured to receive, process, and respond to host connection and storage requests from client or host systems. Storage controller memory 514.2 may include a storage manager 542 configured to manage read and write operations to non-volatile memory devices 520. Storage controller memory 514.2 may include a migration engine 544 configured manage storage node operations for data migration and handling storage requests during the data migration. In some embodiments, each storage node may include instances of storage controller memory 514.2 and some or all of the components thereof.

Storage system interface 530 may include an interface protocol and/or set of functions and parameters for connecting to and managing requests to and responses from storage nodes or systems. For example, storage system interface 530 may include functions for establishing host storage connections to namespaces in one or more storage nodes and processing and sending host storage requests for reading, writing, modifying, or otherwise manipulating data blocks and their respective client or host data and/or metadata in accordance with host communication and storage protocols. In some embodiments, storage interface 530 may enable direct memory access and/or access over NVMe protocols, such as RDMA and TCP/IP access, through fabric interface 516 to host data stored in non-volatile memory devices 520 accessible through storage nodes including storage controller memory 514.2. In some embodiments, storage system interface 530 may include migration logic for managing storage requests to a pair of storage nodes engaged in a data migration. For example, the migration logic may be implemented through multipath policy 530.6.

In some embodiments, storage system interface 530 may include a plurality of hardware and/or software modules configured to use processor 512 and memory 514 to handle or manage defined operations of storage system interface 530. In some embodiments, storage system interface 530 may include a storage interface protocol 530.1 configured to comply with the physical, transport, and storage application protocols supported by the storage nodes for communication over fabric interface 516. Storage interface protocol 530.1 may include both PCIe and NVMe compliant communication, command, and syntax functions, procedures, and data structures. In some embodiments, storage interface protocol 530.1 may include an NVMeoF or similar protocol supporting RDMA, TCP/IP, and/or other connections for communication between host nodes and target host data in connected storage nodes, such as volumes or namespaces mapped to the particular host. In some embodiments, storage interface protocol 530.1 may be supported by a namespace manager 530.2, a connection manager 530.3, and a storage request manager 530.4.

Namespace manager 530.2 may include be configured to manage one or more namespaces, volumes, or similar logical data groups stored in the storage nodes. For example, namespace manager 530.2 may include logic and data structures for defining a set of namespaces supporting host or client applications that may be mapped to and accessed through one or more logical data connections established through connection manager 530.3. In some embodiments, namespace manager 530.2 may include a target namespace for the data migration between a source storage node and a destination node. For example, the target namespace may be uniquely identified by a namespace identifier and the same namespace identifier may refer to the host data associated with the namespace in both the source storage node and the destination storage node.

Connection manager 530.3 may be configured to establish host storage connections based on a request and response protocol defined by storage interface protocol 530.1. For example, connection manager 530.3 may send requests for a selected namespace to a network address corresponding to a selected storage node and, upon response from the selected storage node, create a uniquely identified connection via fabric interface 516. In some embodiments, the resulting connection may be assigned to an available processing queue in the corresponding storage node and a unique connection identifier may be used by both the host node and the storage node to direct storage requests and storage responses between the two systems.

Storage request manager 530.4 may be configured to handle storage requests directed to the namespaces and corresponding host storage connections allocated through namespace manager 530.2 and connection manager 530.3. For example, once a host storage connection for a given namespace and host connection identifier is allocated a storage node, the host may send any number of storage commands targeting data stored in that namespace. Storage request manager 530.4 may send storage requests for storage operations received or generated by the host node and may receive and process storage responses to those storage requests, such as returned data for read operations or status messages for write, delete, or other operations. In some embodiments, storage request manager 530.4 may use dedicated queues allocated to the host storage connections (and therefore namespaces and target storage nodes). For example, storage request manager 530.4 may allocate sent storage requests to host completion queues 530.5 to monitor for a response from the host storage connection to which the storage request was sent. This may allow the host node to manage parallel storage requests across multiple host storage connections, including multiple host storage connections to the same namespace. In some embodiments, the use of host completion queue 530.5 to receive storage responses may require that the storage response be sent on the same host storage connection from which it was received.

In some embodiments, storage system interface 530 may use one or more multipath policies to manage multiple connections to the same namespace. For example, storage system interface 530 may include multipath policy 530.6 for handling host storage connections with a target namespace involved in a data migration between a source storage node and a destination storage node. In some embodiments, multipath policy 530.6 may be a specialized multipath policy that is only enabled during the data migration and contains the host migration logic for managing storage operations to the source and destination storage nodes during the data migration. For example, storage interface protocol 530.1 may support a library, configuration file, parameter set, or similar mechanism for including a plurality of multipath policies and selectively enabling or disabling them during different operating periods or under specified system conditions. In some embodiments, multipath policy 530.6 may be enabled at the beginning of the data migration and disabled when the data migration is complete.

In some embodiments, multipath policy 530.6 may include a target namespace 530.6.1, a source address 530.6.2, and a destination address 530.6.3 used to configure the multipath policy for a particular data migration event or operating period. For example, target namespace 530.6.1 may include the namespace identifier for the namespace being migrated, source address 530.6.2 may provide the network address (in accordance with storage interface protocol 530.1) and/or host storage connection identifier for the target namespace in the source storage node, and destination address 530.6.3 may include the network address and/or host storage connection identifier for the target namespace in the destination storage node. Active host storage connections to the same namespace in the different storage nodes may be managed by multipath policy 530.6 to enable storage request manager 530.4 to send storage requests to both the source storage node and the destination node for processing during the data migration (and while multipath policy 530.6 is active).

In some embodiments, multipath policy 530.6 may include migration table 530.6.4 configured to selectively store migrated block indicators in response to block migrated notifications from the storage nodes during the data migration. For example, migration table 530.6.4 may include a host hash table similar to host hash table 214 in FIG. 2 and including migrated block indicators for LBAs that the host node has received notification of. In some embodiments, migration table 530.6.4 does not include migration status for all data blocks in the target namespace, but only selectively adds migrated block indicators for data blocks that it targets with a storage request and receives a migration update from the storage nodes. For example, migration table 530.6.4 may not include migrated block indicators for data blocks that are not targeted with a storage operation during the data migration or that were still in the source storage node when targeted. Migration table 530.6.4 may represent a "best guess" of where to direct any given storage operation until a migration update is received that indicates the target data block has moved to the destination storage node.

Multipath policy 530.6 may include a target block check 530.6.5 that comprises logic for determining where a storage request should be directed. When storage request manager 530.4 determines a storage request targeting a data block in the target namespace for the data migration, target block check 530.6.5 may be invoked to search for the target data block in migration table 530.6.4. In some embodiments, the search of migration table 530.6.4 may return a null result because no block migrated indicator corresponding to the target data block exists in the table and target block check 530.6.5 may indicate that the source storage node should be used for processing the request. In other instances, the search of migration table 530.6.4 may return a block migrated indicator for the target data block and target block check 530.6.5 may indicate that the destination storage node includes the migrated data block and should be used for processing the request.

Multipath policy 530.6 may include a migrated block update 530.6.6 that comprises logic for updating migration table 530.6.4 based on updated block notifications received by storage system interface 530. For example, responsive to a migrated block notification or other migration update message from the source storage node, the LBA of the target data block may be added in a migrated block indicator in migration table 530.6.4. In some embodiments, multipath policy 530.6 may include additional logic for handling additional migration update messages, such as notification of migration being complete. For example, multipath policy 530.6 may include migration complete 530.6.7 comprising logic for responding to a migration complete notification from the source or destination storage node and/or another source, such as a system administrator. In some embodiments, migration complete 530.6.7 may initiate a sequence of cleanup actions, such as deleting migration table 530.6.4, terminating the connection with the target namespace in the source storage node, assuring that the destination storage node is used as the default location for storage requests to the target namespace, and/or disabling or inactivating multipath policy 530.6 for the target namespace.

Host interface 540 may include an interface protocol and/or set of functions and parameters for receiving, parsing, responding to, and otherwise managing requests from host nodes or systems. For example, host interface 530 may include functions for receiving and processing host connection requests for establishing host connections with one or more volumes or namespaces stored in storage devices and host storage requests for reading, writing, modifying, or otherwise manipulating data blocks and their respective client or host data and/or metadata in accordance with host communication and storage protocols. In some embodiments, host interface 540 may enable direct memory access and/or access over NVMe protocols, such as RDMA and TCP/IP access, through fabric interface 516 to host data units stored in non-volatile memory devices 520. For example, host interface 550 may include host communication protocols compatible with ethernet and/or another host interface that supports use of NVMe and/or RDMA protocols for data access to host data. Host interface 550 may further include host communication protocols compatible with accessing storage node and/or host node resources, such memory buffers, processor cores, queue pairs, and/or specialized assistance for computational tasks.

In some embodiments, host interface 540 may include a plurality of hardware and/or software modules configured to use processor 512 and memory 514 to handle or manage defined operations of host interface 530. For example, host interface 540 may include a storage interface protocol 540.1 configured to comply with the physical, transport, and storage application protocols supported by the host for communication over fabric interface 516. For example, host interface 540 may include a connection request handler

540.2 configured to receive and respond to host connection requests for establishing host storage connections. For example, host interface 540 may include a storage request handler 540.3 configured to receive host storage commands to a particular host connection. For example, host interface 540 may include a host notifier 540.4 configured to support migration engine 544 for host communications related to migration status updates, including migrated block notifications. In some embodiments, host interface 540 may include additional modules (not shown) for command handling, buffer management, storage device management and reporting, and other host-side functions.

In some embodiments, storage interface protocol 540.1 may include both PCIe and NVMe compliant communication, command, and syntax functions, procedures, and data structures. In some embodiments, storage interface protocol 540.1 may include an NVMeoF or similar protocol supporting RDMA, TCP/IP, and/or other connections for communication between host nodes and target host data in non-volatile memory 520, such as volumes or namespaces mapped to the particular host. Storage interface protocol 540.1 may include interface definitions for receiving host connection requests and storage commands from the fabric network, as well as for providing responses to those requests and commands. In some embodiments, storage interface protocol 540.1 may assure that host interface 540 is compliant with host request, command, and response syntax while the backend of host interface 540 may be configured to interface with storage manager 542 to provide communication to the storage devices in the storage node and migration engine 544 for the source or destination storage node migration logic during a data migration operation.

Connection request handler 540.2 may include interfaces, functions, parameters, and/or data structures for receiving host connection requests in accordance with storage interface protocol 540.1, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 540.2 may receive a host storage connection request for a target namespace of the namespaces 540.2.1 in a NVMe-oF storage array and provide an appropriate namespace storage connection and host response to establish host connections 540.2.2. In some embodiments, connection request handler 540.2 may generate entries in a connection log table or similar data structure indexed by unique host connection identifiers for each host connection 540.2.2 and including corresponding namespaces 540.2.1 for the connections and other information.

In some embodiments, host storage request handler 540.3 may include interfaces, functions, parameters, and/or data structures to manage storage requests and responses through host storage connections allocated through connection request handler 540.2. For example, once a host storage connection for a given namespace and host connection identifier is allocated to a back-end queue-pair, the host may send any number of storage commands targeting data stored in that namespace. Storage request handler 540.3 may parse the incoming storage requests and direct them to storage manager 542 for processing. Storage request handler 540.3 may also maintain return paths for responses from the storage commands, such as corresponding queue-pairs for providing responses back to the correct host via the corresponding host completion queue. For example, host connections may include response addressing information, which may include the host connection identifier, for host completion queues 530.5 configured to receive storage device responses to the host storage requests for each host connection.

In some embodiments, storage request handler 540.3 may operate in conjunction with migration engine 544 during a data migration operation to provide the host communications to support the data migration operations. For example, storage request handler 540.3 may check with migration engine 544 and/or storage manager 542 to determine whether the target block of a received storage request is valid and can be processed by the source storage node or migration engine 544 may redirect the storage request to the destination storage node. Storage request handler 540.2 may be configured to return the storage request response to the host node regardless of whether it is processed locally by the source storage node or the source storage node acts as a proxy for forwarded processing by the destination storage node.

In some embodiments, host interface 540 may include host notifier 540.4 configured for communication with the host node for messages that are not part of the standard request and response protocol of storage interface protocol 540.1. For example, host notifier 540.4 may be configured to generate and send notification messages related to migration operation status and/or migrated block notifications for data blocks that are no longer valid in the source storage node. In some embodiments, host notifier 540.4 may operate in conjunction with, include, or be invoked by host updater 544.7 and/or complete notification 544.8 from migration engine 544. For example, host notifier 540.4 may receive a message, message request, or message parameters from migration engine 544 and generate and send (or forward) the message to a host communication channel, such as a command buffer configured to receive out-of-band messages from the storage nodes (separate from the data buffers used for returning host data in response to storage requests).

Storage manager 542 may include an interface protocol and/or set of functions and parameters for reading, writing, and deleting data units in corresponding storage devices. For example, storage interface 540 may include functions for executing host data operations related to host storage requests or commands received through host interface 540 once a host connection is established. In some embodiments, storage manager 542 may be configured with logic for handling different operation types for processing by the storage devices, such as read, write, delete, and other operations. For example, storage manager 542 may include a read command handler 542.1, a write command handler 542.2, and a delete command handler 542.3. For example, read command handler 542.1 may execute GET or read commands to read data from non-volatile memory devices 520. Write command handler 542.2 may execute PUT or write commands to write host data units to non-volatile memory devices 520. Delete command handler 542.3 may execute DELETE commands to delete data from non-volatile memory devices 520, or at least mark a data location for deletion until a future garbage collection or similar operation actually deletes the data or reallocates the physical storage location to another purpose. In some embodiments, storage manager 542 may be configured to support a data migration by processing migration PUT requests from the source storage node to the destination storage node. For example, migration engine 544 may be allocated storage processing resources in storage manager 542 for supporting migration queue 544.2 and/or migration processor 544.4 as foreground or background data processing priorities.

In some embodiments, storage manager 542 may be configured to monitor valid data blocks stored in the storage node. For example, storage manager 542 may include one or more LBA bitmaps 542.4 corresponding to data blocks stored for a given namespace and corresponding storage devices in the storage node. In some embodiments, LBA bitmap 542.4 may include bits allocated to each data block in use in a namespace and act as a validity indicator for each data block. For example, a 1 value in the bit corresponding to a target LBA may correspond to the LBA containing valid data (valid data block status) and a 0 value in the bit corresponding to the target LBA may correspond to the LBA containing invalid data (invalid data block status). In some embodiments, data blocks may be invalidated in LBA bitmap 542.4 in the source storage node as migration operations are confirmed and the corresponding data block is successfully stored in the destination storage node. A corresponding LBA bitmap in the destination storage node may then include a validity indicator with a valid status for the migrated data block.

Migration engine 544 may include interfaces, functions, parameters, and/or data structures to manage data migration between the source and destination storage nodes, including selective communication with the host for migration updates. In some embodiments, the source storage node and the destination storage node include an instances of migration engine 544, but only certain modules may be activated depending on whether the storage node is in the source or destination role for any given data migration. For example, the source storage node may include migration initiator 544.1, migration queue 544.2, validity checker 544.4, operation type checker 544.5, host updater 544.7, and complete notification 544.8 for managing the overall data migration operation. Both the source storage node and destination storage node may include complementary migration processors 544.3 and request redirectors 544.6. Other configurations and divisions of the functions of migration engine 544 between the source and destination storage nodes are possible.

In some embodiments, migration engine 544 may include a migration initiator 544.1 configured to start and manage the overall data migration operation. For example, migration initiator 544.1 may receive a command from a system administrator to initiate a data migration for a target namespace and designate the source storage node identifier and the destination storage node identifier. Migration initiator 544.1 may be configured to establish a peer-to-peer storage connection with the destination storage node using a similar storage interface protocol to storage interface protocol 540.1 over fabric interface 516. In some embodiments, the migration operation may be governed by a set of parameters embodied in a migration configuration. For example, the target namespace, source storage node identifier, destination storage node identifier, priority parameters, host support parameters, and other parameters may comprise the migration configuration. In some embodiments, the migration configuration may include enabling the processing of storage operations across both the source and destination node during the data migration operation. For example, the migration configuration may include a flag, indicator, or other parameter value for enabling storage operations under the systems and methods described herein.

In some embodiments, migration initiator 544.1 may include logic for identifying each data block in the target namespace and selecting the data blocks for processing in a sequence during the data migration. For example, migration initiator 544.1 may populate migration queue 544.2 with a sequence for LBAs for systematically migrating each data block from the source storage node to the destination storage node. In some embodiments, the migration configuration may include parameters for determining how LBAs are selected and ordered in migration queue 544.2. Migration processor 544.3 in the source storage node may then select a data block for migration and PUT the data block from the source storage node to the destination storage node. In some embodiments, migration processor 544.3 may invoke storage manager 542 to execute the PUT operations for the data migrations. The destination storage node may include a corresponding migration processor 544.3 that receives and processes the PUT command to store the migrated data block in the storage devices of the destination storage node. Migration processor 544.3 for the destination storage node may also provide a response message or indicator to the source storage node to notify of migration status and, more specifically, confirm when migrated data blocks are successfully saved to non-volatile memory 520. Migration processor 544.3 in the source storage node may, in turn, track the response messages to confirm when the transfer of a data block is complete and that data block may be invalidated, such as by changing the validity indicator in LBA bitmap 542.4 for the transferred data block, and removed from migration queue 544.2. In some embodiments, migration engine 544 may include dedicated or allocated processing and memory resources for executing the data migration using a single or parallel migration pipelines established between the source storage node and the destination storage node. In some embodiments, migration initiator 544.1 may monitor migration queue 544.2 to determine when migration is complete and all data blocks in the namespace have been successfully migrated from the source storage node to the destination storage node.

In some embodiments, migration engine 544 may include a validity checker 544.4 and an operation type checker 544.5 for supporting storage operation processing during the data migration. For example, validity checker 544.4 and/or operation type checker 544.5 may be configured as a service to storage request handler 540.3 and/or storage manager 542 for determining whether a storage request should be executed against a target data block that may or may not be valid in the source storage node. When a storage request is received, the LBA of the target data block may be used to check LBA bitmap 542.4 for the namespace in the source storage node to see whether a valid or invalid validity indicator is returned. If a valid status is returned, storage manager 542 may process the storage request as normal. If an invalid status us returned, request redirector 544.6 may be invoked for processing the storage request, rather than storage manager 542.

In some embodiments, operation type checker 544.5 may be configured to determine an operation type for the storage request and evaluate logic for how the storage request should be handled. For example, the operation type checker 544.5 may be configured to determine whether the operation type is a read, write, delete, or other operation type. Read, delete, and other operation types may be executed against the source storage node (assuming a valid status was returned by validity checker 544.4). In some embodiments, write operation types may be configured to invoke request redirector 544.6. For example, rather than processing the write request to the source storage node and then having to separately migrate the newly written data block, request redirector 544.6 may forward the write request to the destination storage node for processing and avoid adding a new data block to migration queue 544.2. In the case that the write was modifying an existing data block, the prior (valid) instance of the data block in the source storage system may be invalidated in LBA bitmap 542.4.

In some embodiments, request redirector 544.6 may be configured to forward the storage request to the destination storage node for processing against the valid instances of the migrated data block that is stored there. For example, responsive to the invalidity or write type conditions of validity checker 544.4 and/or operation type checker 544.5, request redirector 544.6 may be invoked to send the storage request to the destination storage device over a peer-to-peer storage connection. The destination storage node may include an instance of request redirector 544.6 configured to receive, parse, and execute the storage request against the destination storage node, such as by invoking functions similar to those for storage request handler 540.3, but for peer storage requests, and storage manager 542. Request redirector 544.6 in the destination storage node may then return a response message to the source storage node as if it were the host node. Request redirector 544.6 in the source storage node may receive and parse the response message to initiate updating of the migration status, such as for a write operation, and forward the response message to the host node (using storage request handler 540.3) as the storage request response to the host completion queue for that storage request.

In some embodiments, migration engine 544 may include a host updater 544.7 for selectively updating the host on migration status of data blocks targeted in the source storage node during the data migration. For example, host updater 544.7 may be invoked by validity checker 544.4 and/or operation type checker 544.5 to communicate that the valid data block is no longer located in the source storage node and future requests for that data block should be directed to the destination storage node. In some embodiments, host updater 544.7 only provides block migrated notifications to the host node in the instance that the source node no longer contains the valid data block and does not provide any migration update if the valid block is still in the source storage node. In some embodiments, host updater 544.7 may operate in conjunction with host notifier 540.4 to provide a separate migrated block notification from the storage response returned by storage request handler 540.3. In some embodiments, the migrated block notification may be appended to the request response for the storage request as a message parameter value.

In some embodiments, migration engine 544 may also be configured to generate a migration complete notification 544.8 and send it to the host node, destination node, and/or other systems, such as a system administrator. In some embodiments, migration complete notification 544.8 may trigger cleanup operations in other systems and migration complete status may initiate cleanup operations in the source storage node as well. For example, responsive to migration complete status and/or sending the migration complete notification, migration engine 544 in the source storage node may initiate termination of the host storage connection for the migrated namespace, initiate deletion and garbage collection for the migrated namespace, and delete the corresponding LBA bitmap.

Figure 6:
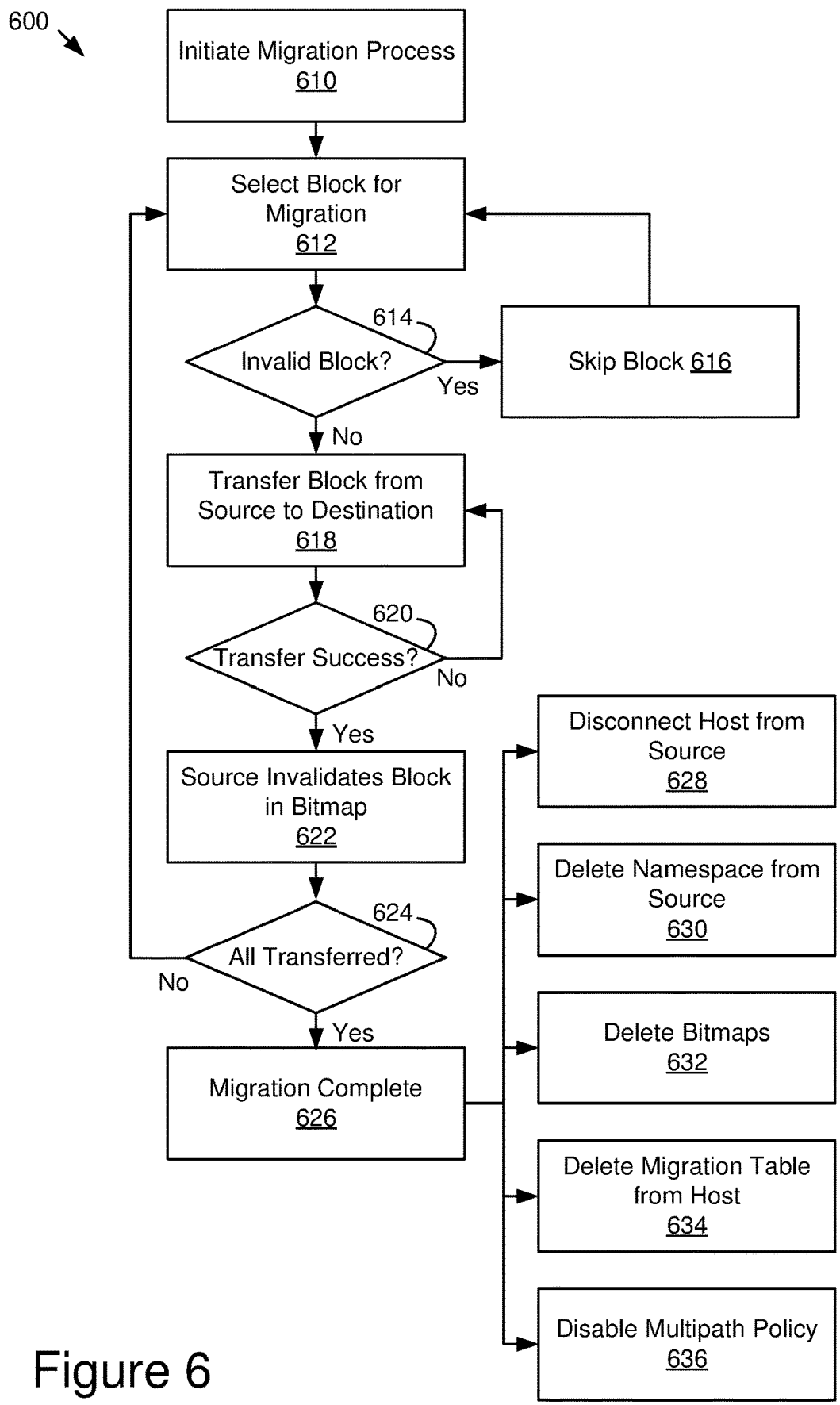
FIG. 6 is a flowchart of an example method of executing a data migration.

As shown in FIG. 6, storage system 500 may be operated according to an example method for method of executing a data migration, i.e., according to method 600 illustrated by blocks 610-636 in FIG. 6.

At block 610, a migration process may be initiated. For example, a source storage node may include a migration engine configured to initiate a migration operation to move the data blocks in a namespace from the source storage node to a destination storage node.

At block 612, a data block may be selected for migration. For example, the migration engine in the source storage node may determine a migration queue of the data blocks for migration in the namespace and select the next data block in the migration queue for migration.

At block 614, whether the data block selected is invalid may be determined. For example, the migration engine may check a validity indicator for the selected data block in a bitmap maintained in the source storage node. If the block is invalid, method 600 may proceed to block 616, skip the selected data block, and return to block 612 to select a next data block. If the block is valid, method 600 may proceed to block 618.

At block 618, the data block may be transferred from the source storage node to the destination storage node. For example, the migration engine may process a data transfer operation from the source storage node to the destination storage node.

At block 620, whether the data block transfer was successful may be determined. For example, the migration engine in the source storage node may await a data transfer response message from the destination storage node, where a successful data transfer results in a success response within a transfer time window and an error result or no response within the transfer time window is interpreted as unsuccessful. If the transfer is not a success, method 600 may return to block 618 to retry the transfer and/or initiate other error handling (not shown). IF the transfer is successful, method 600 may proceed to block 622.

At block 622, the source storage node invalidates the transferred data block in the bitmap. For example, the migration engine may change the validity indicator for the data block in the bitmap from a valid value to an invalid value.

At block 624, whether all data blocks in the migration operation have been transferred may be determined. For example, the migration engine may use the migration queue and/or the bitmap to track the progress of the data migration and when the migration queue is empty and/or there are no valid data blocks remaining in the namespace, all data blocks have been transferred. If all data blocks have been transferred, method 600 proceeds to block 626. If not all data blocks have been transferred, method 600 may return to block 612 to select a next data block for migration.

At block 626, the migration process may be determined to be complete. For example, the source storage node may determine that the migration operation is complete and send a migration complete notification to other nodes in the storage system, such as the host and destination nodes.

In some embodiments, the migration complete status and/or migration complete notification(s) may trigger additional cleanup operations. At block 628, the host system may be disconnected from the source node. For example, a host storage connection established under the storage interface protocol between the two systems may be terminated by one system and the other system may be notified that the connection and corresponding host connection identifier is no longer valid.

At block 630, the namespace may be deleted from the source storage array. For example, the migration engine and/or a system administrator may initiate a delete operation for the transferred namespace.

At block 632, the bitmaps may be deleted for the namespace. For example, the source storage node may delete the bitmap corresponding to the transferred namespace. In some embodiments, the destination storage node may also maintain a bitmap for tracking validity of migrated data blocks during the data migration and this bitmap may be deleted as well.

At block 634, a migration table may be deleted from the host node. For example, the host node may use a migration table to selectively track migrated data blocks during the data migration and may delete this migration table following completion of the migration process.

At block 636, a multipath policy may be disabled in the host node. For example, the host node may use a multipath policy to handle storage operations during the migration process and may disable the multipath policy for the migrated namespace once the migration is complete.

Figure 7:
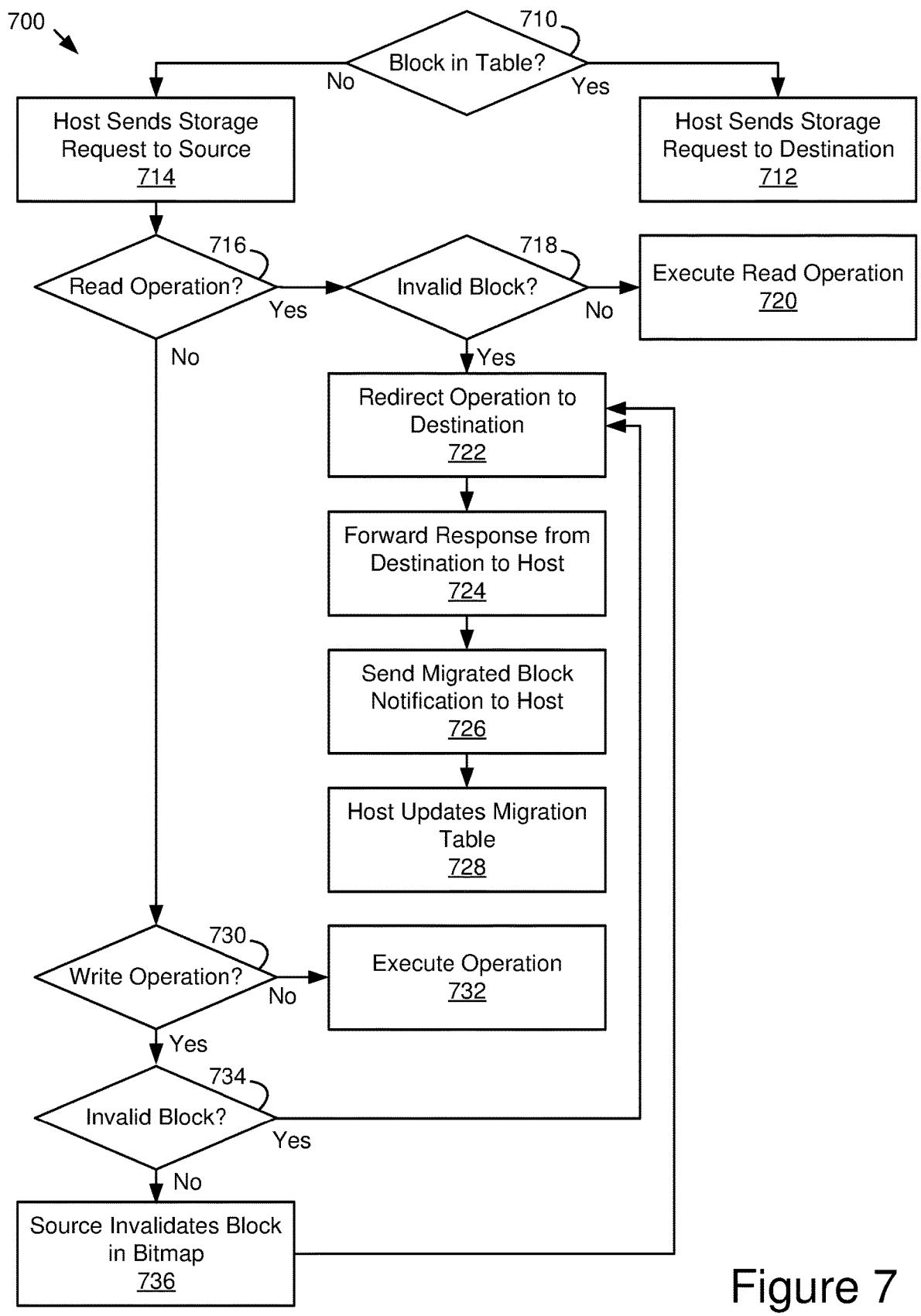
FIG. 7 is a flowchart of an example method of directing storage operations during a data migration.

As shown in FIG. 7, storage system 500 may be operated according to an example method for directing storage operations during a data migration, i.e., according to method 700 illustrated by blocks 710-736 in FIG. 7.

At block 710, whether a target data block is present in a migration table may be determined. For example, a multipath policy in a host node may check the data block for a storage request against a set of migrated block indicators in a migration table or host hash table to determine whether a migrated block indicator exists for the target data block. If the migrated block indicator is found, method 700 may proceed to block 712 to direct the storage request. If the migrated block indicator is not found, method 700 may proceed to block 714 to direct the storage request.

At block 712, the storage request may be sent to the destination storage node by the host node. For example, the host node may use a host storage connection with the destination storage node for the namespace being migrated to send the storage request.

At block 714, the storage request may be sent to the source storage node by the host node. For example, the host node may use a host storage connection with the source storage mode for the namespace being migrated to send the storage request.

At block 716, whether the storage operation is a read operation may be determined. For example, a migration engine in the source storage node may check the operation type to determine whether it is a read operation. If the operation type is a read operation, method 700 may proceed to block 718. If the operation type is not a read operation, method 700 may proceed to block 730.

At block 718, whether the target data block is an invalid block may be determined. For example, the migration engine in the source storage node may check the validity indicator for the target data block in a bitmap. If the validity indicator is valid, method 700 may proceed to block 720. If the validity indicator is invalid, method 700 may proceed to block 722.

At block 720, a read operation may be executed. For example, the source storage node may execute the read operation against the valid data block in its associated storage devices and return the read data to the host node.

At block 722, the storage operation may be redirected to the destination storage node. For example, the migration engine may forward the storage request to the destination storage node and receive the request response from the destination storage node.

At block 724, the response may be forwarded to the host. For example, the migration engine may forward the request response received from the destination storage node to the host node using the host storage connection and host completion queue associated with the original storage request.

At block 726, a migrated block notification may be sent to the host. For example, the migration engine may generate and send a migrated block notification message to the host node identifying the target data block as migrated to the destination storage node.

At block 728, the migration table at the host may be updated. For example, responsive to receiving the migrated block notification, the host node may update a migrated block indicator for the target data block in the migration table, so that future storage requests will be directed to the destination storage node at block 712.

At block 720, whether the storage operation is a write operation may be determined. For example, the migration engine in the source storage node may check the operation type to determine whether it is a write operation. If the operation type is a write operation, method 700 may proceed to block 734. If the operation type is not a write operation, method 700 may proceed to block 732.

At block 732, the other type of storage operation may be executed. For example, if the storage request includes an operation type indicator for a delete operation, that delete operation may be executed by the source storage node using the target data unit in the storage devices associated with the source storage node. A delete operation would invalidate the data block, both preventing inclusion in the data migration and preventing the host node from issuing further storage operations related to the deleted data block.

At block 734, whether the target data block is an invalid block may be determined. For example, the migration engine in the source storage node may check the validity indicator for the target data block in a bitmap. If the validity indicator is valid, method 700 may proceed to block 736. If the validity indicator is invalid, method 700 may proceed to block 722.

At block 736, the data block may be invalidated in the source storage node. For example, the migration engine may change the validity indicator for the target data block in the bitmap to invalid. Method 700 may then proceed to block 722 to redirect the write operation to the destination storage node.

Figure 8:
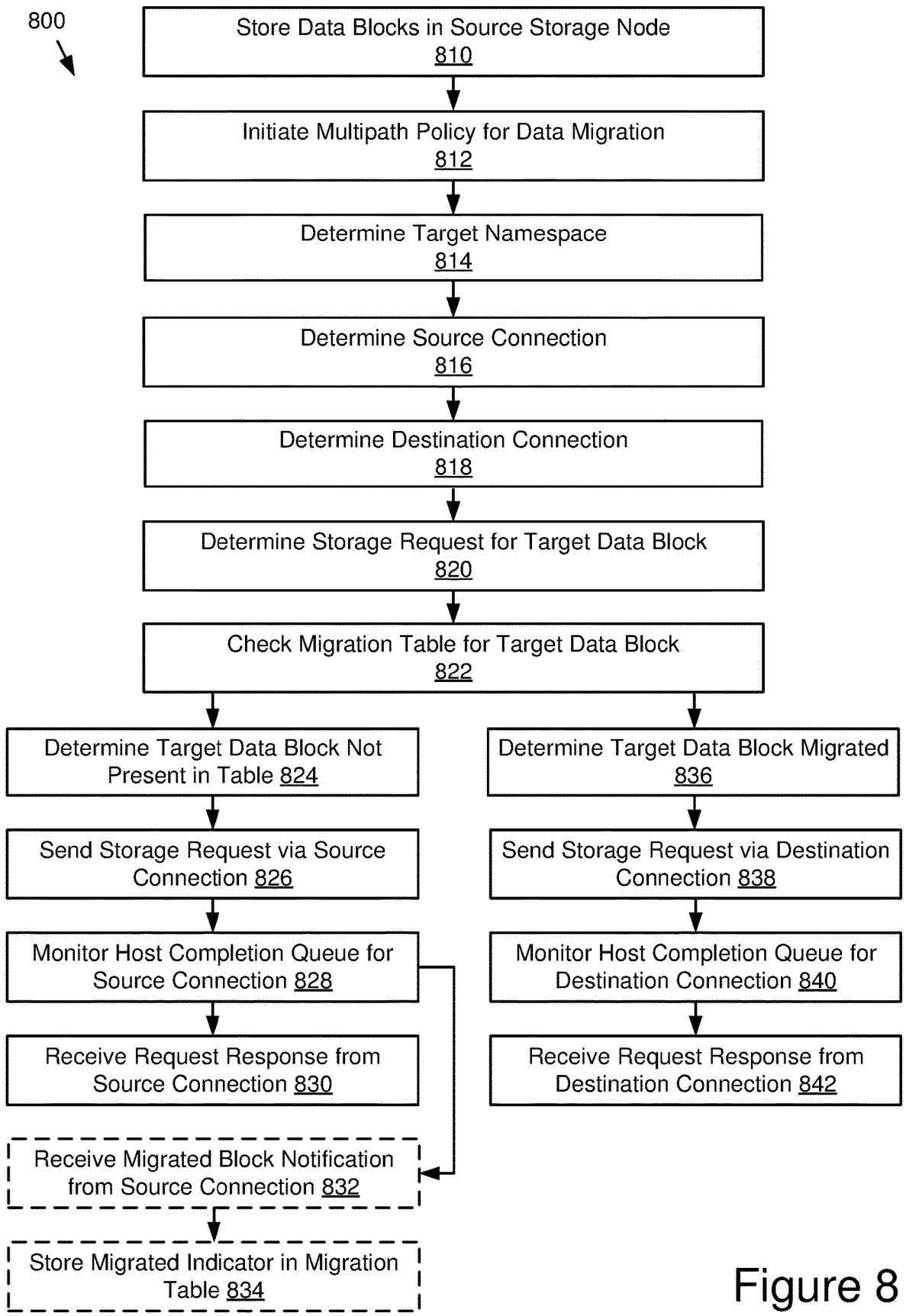
FIG. 8 is a flowchart of an example method of host system management of storage operations during a data migration using a multipath policy.

As shown in FIG. 8, storage system 500 may be operated according to an example method for host system management of storage operations during a data migration using a multipath policy, i.e., according to method 800 illustrated by blocks 810-842 in FIG. 8.

At block 810, host data blocks are stored in a source storage node. For example, the host system may be configured to use the source storage node to support storage operations for one or more namespaces during an operating period prior to the data migration.

At block 812, a multipath policy may be initiated for a data migration. For example, a data migration multipath policy may be predefined and stored in a multipath policy library for use during data migrations.

At block 814, a targe namespace may be determined for the multipath policy. For example, a namespace in the source storage node to be migrated to the destination storage node may be selected.

At block 816, a source connection may be determined for the multipath policy. For example, the host system may have an existing host storage connection with the source storage node for the target namespace or the host system may initiate a new host storage connection for the target namespace with the source storage node and the host connection identifier may be associated with the source role in the multipath policy.

At block 818, a destination connection may be determined for the multipath policy. For example, the host system may initiate a new host storage connection for the target namespace with the destination storage node and the host connection identifier may be associated with the source role in the multipath policy.

At block 820, a storage request may be determined for a target data block in the target namespace. For example, the host system may receive or generate a storage request for a storage operation targeting a data block in the namespace being migrated and use the multipath policy to determine which connection the storage request should be directed to.

At block 822, a migration table may be checked for the target data block. For example, the multipath policy may use a migration table or host hash table to selectively maintain migrated block indicators for data blocks that are known to be in the destination storage system.

At block 824, the target data block may be determined to not be present in the migration table. For example, the host system may search the migration table using the host LBA and find no corresponding entry for the host LBA in the migration table.

At block 826, the storage request may be sent to the source storage node using the source connection determined at block 816. For example, the host system may send the storage request using the host connection identifier associated with the source connection for the namespace.

At block 828, a host completion queue associated with the source connection may be monitored. For example, the host system may expect a request response to the storage request to be returned using the same host connection identifier to which the storage request was sent.

At block 830, the request response may be received from the source connection. For example, the host system may receive the request response with a request identifier corresponding to the original storage request and the host connection identifier associated with the host storage connection with the source storage node. Note that, in some embodiments, the host system may receive this response from the source storage node regardless of whether it was processed by the source storage node or proxied to the destination storage node.

At block 832, a migrated block notification may be received from the source connection in response to the storage request. For example, the host system may receive an additional notification message or a migrated block notification parameter in the received request response that indicates that the target data block has been migrated to the destination storage system.

At block 834, a migrated block indicator may be stored in the migration table. For example, the host system may update the migration table to include the migrated block indicator corresponding to the target data block's host LBA such that future storage requests for the same data block may be directed to the destination storage node.

At block 836, the target data block may be determined to have been migrated to the destination storage node. For example, the host system may search the migration table using the host LBA and find a corresponding entry for the host LBA in the migration table.

At block 838, the storage request may be sent to the destination storage node using the destination connection determined at block 818. For example, the host system may send the storage request using the host connection identifier associated with the destination connection for the namespace.

At block 840, a host completion queue associated with the destination connection may be monitored. For example, the host system may expect a request response to the storage request to be returned using the same host connection identifier to which the storage request was sent.

At block 842, the request response may be received from the destination connection. For example, the host system may receive the request response with a request identifier corresponding to the storage request and the host connection identifier associated with the host storage connection with the destination storage node.

Figure 9:
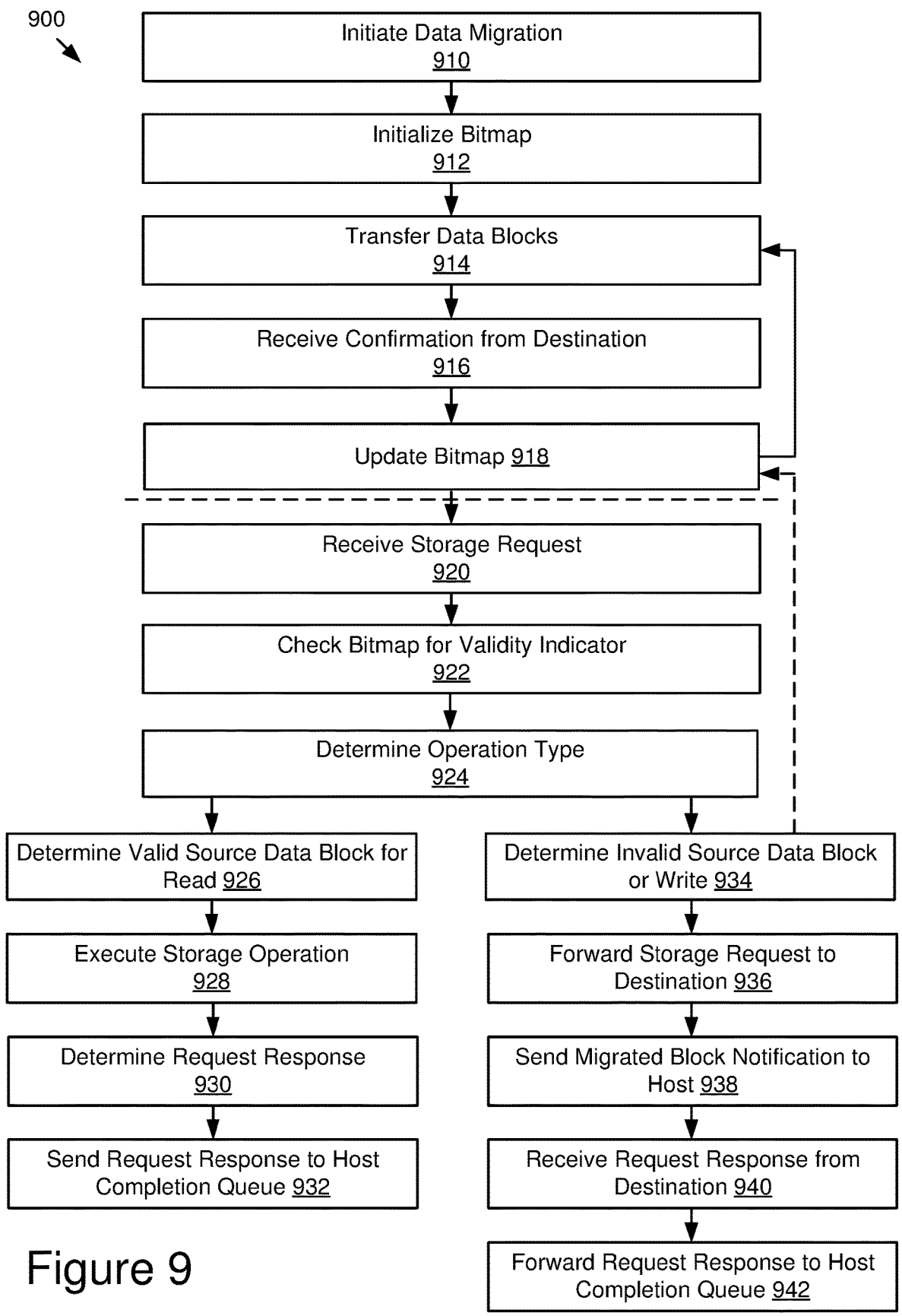
FIG. 9 is a flowchart of an example method of managing a data migration and incoming storage operations at a source storage node.

As shown in FIG. 9, storage system 500 may be operated according to an example method for managing a data migration and incoming storage operations at a source storage node, i.e., according to method 900 illustrated by blocks 910-942 in FIG. 9.

At block 910, a data migration may be initiated. For example, a migration engine in the source storage node may receive a migration command that includes configuration parameters for a data migration operation.

At block 912, a bitmap may be initialized. For example, the migration engine may initialize an LBA bitmap for the data blocks in the namespace to be migrated when the data migration is started.

At block 914, data blocks may be transferred to a destination storage node. For example, the migration engine may add data blocks for migration to a migration queue and a migration processor may sequentially transfer the data blocks from the source storage node to the destination storage node.

At block 916, confirmation of each data block transfer may be received from the destination storage node. For example, the migration engine may receive transfer completion notifications from the destination storage node to confirm that each data block has been successfully stored in non-volatile memory in the destination storage node.

At block 918, the bitmap may be updated. For example, each time a transfer complete notification is received, the migration engine may update the bitmap to invalidate the transferred data block. Method 900 may return to block 914 to continue the data block transfer until all data blocks are transferred and may send a migration complete notification in response to completing the transfer of all data blocks in the namespace.

At block 920, a storage request may be received by the source storage node. For example, the host system may send a storage request including an operation type and a target data unit to the source storage node for processing. Blocks 920-942 may be selectively executed in parallel with the ongoing data migration in blocks 914-918 to handle storage operation processing during the data migration.

At block 922, the bitmap may be checked for a validity indicator for the target data block. For example, the migration engine may use the LBA of the target data block to index the bitmap and determine whether the target data block is valid or invalid in the source storage node.

At block 924, the operation type may be determined for the storage request. For example, a storage command handler may parse the storage command for an operation type parameter and provide the operation type parameter to an operation type checker in the migration engine.

At block 926, a valid source data block may be determined for a read operation (or another non-write operation). For example, a valid status may be returned at block 922 and a read operation may be returned at block 924 and the logic of the migration engine may determine the handling of the storage operation.

At block 928, the storage operation may be executed. For example, the source storage node may execute the storage operation using the target data block stored in the storage devices of the source storage node.

At block 930, a request response may be determined. For example, the source storage node may generate a request response from the execution of the storage request.

At block 932, the request response may be sent to the host completion queue of the host system. For example, the source storage node may send the request response using the storage request identifier and host storage connection identifier used by the host system to send the storage request.

At block 934, an invalid data block or write operation may be determined. For example, an invalid status may be returned at block 922 or a write operation may be returned at block 924. If a write operation is identified, a bitmap updated may be initiated at block 918 in addition to proceeding to block 936, At block 936, the storage request may be forwarded to the destination storage node. For example, the migration engine may forward the storage request to the destination storage node over a peer-to-peer storage connection for executing the storage operation against the migrated data block stored in the destination storage node.

At block 938, a migrated block notification may be sent to the host system. For example, the migration engine may send a block migrated notification to the host system.

At block 940, a request response may be received from the destination storage node. For example, the migration engine may receive the request response over the peer-to-peer communication channel in response to the destination storage node completing the storage request.

At block 942, the request response may be forwarded to the host completion queue of the host storage system. For example, the source storage node may send the request response received from the destination storage node and use the storage request identifier and host storage connection identifier used by the host system to send the storage request.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a host system, comprising:
   a processor;
   a memory;
   a storage system interface configured to communicate with:
      a source storage node configured to store a plurality of data blocks prior to a data migration; and
      a destination storage node configured to store the plurality of data blocks responsive to completing the data migration;
   a migration table configured to selectively identify transferred data blocks during the data migration; and
   migration logic configured to, during the data migration:
      send, to the source storage node, a first storage request directed to a target data block in the plurality of data blocks;
      receive, from the source storage node, a migrated block notification for the target data block;
      store, in the migration table, a migrated indicator for the target data block, based on the migrated block notification; and
      send, responsive to the migrated indicator for the target data block, a second storage request, directed to the target data block, to the destination storage node.

2. The system of claim 1, wherein:
the processor is configured to determine the first storage request and the second storage request; and
the host system further comprises a host completion queue configured to receive:
   a first request response for the first storage request from the source storage node; and
   a second request response for the second storage request from the destination storage node, wherein the destination storage node is further configured to determine, using the target data block, the first request response and the second request response.

3. The system of claim 2, further comprising:
the source storage node, wherein the source storage node is further configured to:
   forward the first storage request to the destination storage node;
   receive the first request response from the destination storage node; and
   forward the first request response to the host completion queue.

4. The system of claim 3, wherein the source storage node is further configured to:
initiate the data migration;
transfer the plurality of data blocks to the destination storage node during the data migration;
determine that the data migration is complete; and
send a migration complete notification to the host system.

5. The system of claim 4, wherein:
the source storage node further comprises a source bitmap including validity indicators for the plurality of data blocks; and
the source storage node is further configured to, responsive to receiving the first storage request:
   determine, using the validity indicator in the source bitmap for the target data block, a validity condition of the target data block in the source storage node; and
   responsive to the validity condition of the target data block being invalid in the source storage node:
      send, to the host system, the migrated block notification for the target data block; and
      forward, to the destination storage node, the first storage request.

6. The system of claim 5, wherein the source storage node is further configured to, responsive to the first storage request being a write operation and the validity indicator in the source bitmap for the target data block being valid, invalidate the target data block in the source bitmap.

7. The system of claim 1, wherein:
the plurality of data blocks comprises a namespace; and
the storage system interface is further configured to include:
   a first connection assigned to the namespace and a first network address for the source storage node; and
   a second connection assigned to the namespace and a second network address for the destination storage node.

8. The system of claim 1, wherein:
the migration logic is configured as a multipath policy for a namespace during the data migration; and
the host system is further configured to disable, responsive to the data migration being complete, the multipath policy for the namespace.

9. The system of claim 1, wherein:
the migration logic is further configured to:
   check, prior to sending the first storage request, the migration table for the migrated indicator for the target data block; and check, prior to sending the second storage request, the migration table for migrated indicator for the target data block;
the migrated indicator for the target data block is not present at a first time associated with checking prior to sending the first storage request; and
the migrated indicator for the target data block is present at a second time associated with checking prior to sending the second storage request.

10. The system of claim 1, wherein, responsive to the data migration being complete:
the host system is further configured to:
delete the migration table; and
disconnect from the source storage node; and
the source storage node is further configured to:
delete a source bitmap configured for tracking validity of the plurality of data blocks in the source storage node; and
delete a namespace corresponding to the plurality of data blocks.

11. A computer-implemented method, comprising:
storing, in a non-volatile storage medium of a source storage node, a plurality of data blocks prior to a data migration;
migrating the plurality of data blocks from the non-volatile storage medium of the source storage node to a non-volatile storage medium of a destination storage node during the data migration; and
processing, by a processor of a host system, storage requests targeting the plurality of data blocks by, during the data migration:
sending, to the source storage node, a first storage request directed to a target data block in the plurality of data blocks;
receiving, from the source storage node, a migrated block notification for the target data block;
storing, in a migration table stored in a memory of the host system, a migrated indicator for the target data block, based on the migrated block notification; and
sending, responsive to the migrated indicator for the target data block, a second storage request, directed to the target data block, to the destination storage node.

12. The method of claim 11, further comprising:
determining, by the destination storage node and using the target data block, a first request response for the first storage request;
receiving, at a host completion queue of the host system and from the source storage node, the first request response;
determining, by the destination storage node and using the target data block, a second request response for the second storage request; and
receiving, at the host completion queue of the host system and from the destination storage node, the second request response.

13. The method of claim 12, further comprising:
forwarding, from the source storage node, the first storage request to the destination storage node;
receiving, by the source storage node, the first request response from the destination storage node; and
forwarding, by the source storage node, the first request response to the host completion queue.

14. The method of claim 11, further comprising:
initiating, by the source storage node, the data migration;
transferring, by the source storage node, the plurality of data blocks to the destination storage node during the data migration;
determining, by the source storage node, that the data migration is complete; and
sending, by the source storage node, a migration complete notification to the host system.

15. The method of claim 11, further comprising, responsive to the source storage node receiving the first storage request:
determining, using a validity indicator in a source bitmap for the target data block, a validity condition of the target data block in the source storage node; and
responsive to the validity condition of the target data block being invalid in the source storage node:
sending, from the source storage node to the host system, the migrated block notification for the target data block; and
forwarding, from the source storage node to the destination storage node, the first storage request.

16. The method of claim 15, further comprising:
determining an operation type for the first storage request; and
responsive to determining the operation type of the first storage request to be a write operation and the validity indicator in the source bitmap for the target data block being valid, invalidating the target data block in the source bitmap.

17. The method of claim 14, further comprising:
determining a first connection assigned to a namespace and a first network address for the source storage node, wherein the plurality of data blocks comprises the namespace; and
determining a second connection assigned to the namespace and a second network address for the destination storage node.

18. The method of claim 11, further comprising:
checking, prior to sending the first storage request, the migration table for the migrated indicator for the target data block, wherein the migrated indicator for the target data block is not present at a first time associated with checking prior to sending the first storage request; and
checking, prior to sending the second storage request, the migration table for migrated indicator for the target data block, wherein the migrated indicator for the target data block is present at a second time associated with checking prior to sending the second storage request.

19. The method of claim 11, further comprising:
determining the data migration is complete; and
responsive to determining the data migration is complete:
deleting the migration table;
disconnecting the host system from the source storage node;
deleting, from the source storage node, a source bitmap configured for tracking validity of the plurality of data blocks in the source storage node; and
deleting, from the source storage node, a namespace corresponding to the plurality of data blocks.

20. A storage system comprising:
a source storage node configured to store a plurality of data blocks prior to a data migration;
a destination storage node configured to store the plurality of data blocks responsive to completing the data migration; and a host system configured for communication with the source storage node and the destination storage node and comprising:
  a migration table configured to selectively identify transferred data blocks during the data migration;
  means for sending, during the data migration and to the source storage node, a first storage request directed to a target data block in the plurality of data blocks;
  means for receiving, during the data migration and from the source storage node, a migrated block notification for the target data block;
  means for storing, during the data migration and in the migration table, a migrated indicator for the target data block, based on the migrated block notification; and
  means for sending, during the data migration and responsive to the migrated indicator for the target data block, a second storage request, directed to the target data block, to the destination storage node.

* * * * *